July 13, 1965 L. GRASSER ETAL 3,194,690

PRODUCING A SEMICONDUCTOR ARRANGEMENT

Filed May 14, 1962

United States Patent Office 3,194,690

Patented July 13, 1965

3,194,690
PRODUCING A SEMICONDUCTOR ARRANGEMENT

Leo Grasser, Munich, and Friedrich Schnell, Munich-Feldmoching, Germany, assignors to Siemens & Halske-Aktiengesellschaft Berlin and Munich, a corporation of Germany Filed May 14, 1962, Ser. No. 194,258
Claims priority, application Germany, May 17, 1961, S 74,016
4 Claims. (Cl. 148—1.5)

The invention disclosed herein is concerned with a method of producing a semiconductor arrangement, comprising disposing electrode metal upon a semiconductor body, embedding the resulting assembly in a powder of a substance which does not react either with the substance of said semiconductor body or that of the electrode metal, and subjecting such system consisting of the semiconductor body and the electrode metal to heating under pressure to effect alloying thereof, and with a device for practicing the method.

In a known alloying method of this kind, which is referred to as powder method, the powder, which consists of graphite, magnesium oxide, aluminum oxide or the like, exerts upon compression thereof a pressure on the embedded system, consisting of the semiconductor body and the electrode metal, from all sides thereof, such as would be exerted by a fluid under pressure, thereby automatically forming a mold fitting exactly the shape of the embedded system. The powder which is in this manner uniformly compressed from all sides of the system also enters into the spaces between the electrodes, thus preventing a lateral flow of the electrode material, that is, preventing alloying together of the electrodes, thereby maintaining the individual parts in assigned position and assuring in this manner uniform wetting of the semiconductor body by the electrode metal, therewith uniform thickness of the alloy layers, which are being produced, and further assuring maintenance respectively of the shape and positional size of the electrodes.

The individual parts of the system are in this method placed together by hand. This manner of assembling the parts is difficult and uneconomical, particularly in cases requiring very small spacing between the individual electrodes arranged upon the surface of a semiconductor body, as is for example required in connection with a transistor for high frequency operation, in which the emitter electrode and the base electrode are disposed on the same side of the semiconductor body, with a spacing amounting only to fractions of a millimeter. The position of the electrode metal upon the semiconductor body must in such a case be adjusted individually, with the aid of a microscope, thus making the procedure very cumbersome.

The object of the present invention is to simplify this alloying method and to avoid to a large extent errors resulting from manual handling.

This object is realized by placing the semiconductor body and the electrode metal, prior to the embedding thereof in the powder, into a mold made of a material which does not wet the semiconductor body and the electrode metal, such mold forming a depression or cavity corresponding as to shape and dimensions thereof to the system comprising the semiconductor body and the electrode metal.

The individual parts of the system can easily be placed into such a mold in which is impressed a pattern corresponding to the configuration and dimensions of the system, such placement involving merely suitable mechanical insertion of the parts or placement thereof by vibration. The mold containing the parts of the system is thereupon embedded in the powder and subjected to heating under pressure until the alloying is accomplished.

The mold employed according to the invention is made of a material which, as noted before, does not wet the semiconductor body and the electrode metal, and which is moreover so soft that no damaging cracks can be formed in the semiconductor body incident to pressing the respective mold into the powder, and that the pressure exerted by the powder on the mold is uniformly transmitted to the parts or components of the embedded system.

The mold used according to the invention may be made of paper foil, foil of synthetic material, for example, polyethylene or may be made of a pill pressed from powder, for example, quartz powder.

Further details of the invention will appear from the description of an example relating to the production of a transistor with alloyed-in electrodes, which is rendered below with reference to the accompanying drawing.

Figure 2:
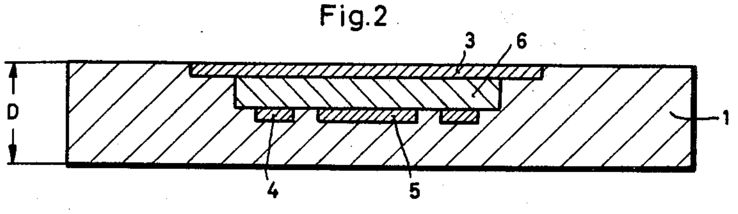
FIG. 2 represents the mold of FIG. 1 in cross-sectional view, after inserting therein the indiviual parts of the desired semiconductor-electrode system.
Figure 3:
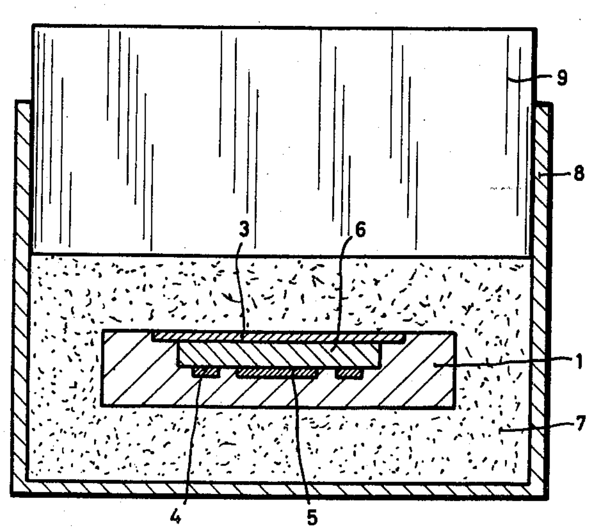
Figure 4:
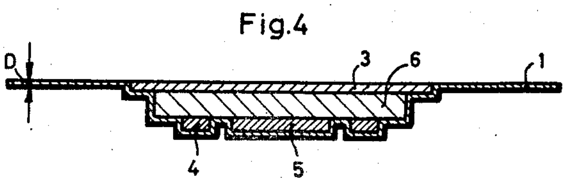

FIG. 3 indicates in cross-sectional view the mold with the individual parts mounted therein, as shown in FIG. 2, after embedding it in a powder; and FIG. 4 illustrates the use of a mold made of relatively very thin foil material.

Like parts are indicated by like reference numerals throughout the figures.

Figure 1:
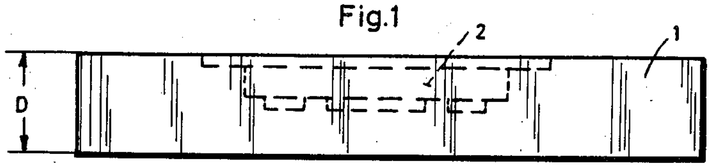
FIG. 1 shows an example of a mold such as is employed in realizing the method according to the invention.

Referring now to FIG. 1, numeral 1 indicates a mold such as is being used in practicing the invention, such mold being provided with a depression or cavity 2 formed therein, the configuration and dimensions of such cavity corresponding to those of the desired system comprising the semiconductor body and the electrode metal. The thickness D of the mold may, for example, exceed the largest dimension of the system as seen in vertical direction. However, this thickness D may be as desired; for example, as shown in FIG. 4, it may be considerably less than the largest dimension of the system as seen in vertical direction.

The mold 1 may be made, for example, of a paper foil or a foil of synthetic material, or of a pressed powder pill, in which is impressed a pattern corresponding to the system which is to be produced. Into the mold are placed the individual components of the system, resulting in the assembly shown in FIG. 2.

Referring to FIG. 2, numeral 5 indicates a circular metal disk, for example, an aluminum disk, about 0.6 millimeter thick, which forms with the semiconductor body 6, in alloyed-in condition, a barrier-free contact, that is, a base contact electrode, the semiconductor body 6 consisting, for example, of p-conductive germanium or silicon. The member 4 is an annular member made of metal, for example, of gold-antimony alloy, having an outer diameter of about 1.5 millimeter and an inner diameter of about 0.7 millimeter, such annular member surrounding the base electrode 5 concentrically and forming in alloyed-in condition in the semiconductor body 6, a zone of opposite conductivity type representing the emitter electrode of the transistor. The metal parts forming these two electrodes 4 and 5 which are very slightly spaced apart, are disposed at the lowermost level of the mold 1.

The semiconductor body 6 which is disposed upon the electrode members 4 and 5, is in the illustrated example a silicon disk with a diameter of 1.8 millimeter and a thickness of about 80 microns.

Upon this semiconductor body 6 is disposed a further metal part 3 having a diameter of about 2 millimeters, such part being made, for example, of a gold-antimony alloy and forming in alloyed-in condition in the semiconductor body 6 a zone of opposite conduction type, representing the collector of the transistor.

The thickness of the electrode metal members 3, 4 and 5 amounts in the illustrated example to about 30 microns.

As shown in FIG. 3, the mold 1, after being provided with the individual parts 3, 4, 5 and 6, is embedded in a powder 7, for example, a graphite powder, contained in a receptacle 8. The powder 7 in the receptacle 8 is compressed by means of a suitably actuated plunger 9, thereby exerting on the parts of the system disposed in the mold 1 pressure from all sides thereof.

The receptacle 8 is made of a material, for example, of steel, which is not deformed by the pressure forces exerted on the walls thereof.

A tubular member may be used in place of the receptacle 8, with a suitably actuated plunger entering thereinto at each end thereof, such plungers exerting pressure on the powder disposed therebetween in which is embedded the mold containing the parts of the system which is to be produced.

The pressure is applied while the respective arrangement is heated, for example, in a suitable furnace, to the alloying temperature of the system parts. The completed semiconductor arrangement is removed from the mold after the cooling thereof.

As already mentioned, the method may be practiced with the use of a mold 1 which is, as shown in FIG. 4, relatively very thin.

The invention may be used in connection with a machine production system for making semiconductor arrangements, such for example as diodes, transistors and solar elements, utilizing germanium, silicon, silicon-germanium alloys or an $A_{III}B_{V}$-combination.

The invention offers particular advantages in the production of semiconductor arrangements comprising mutually very closely disposed electrodes, that is, electrodes which are spaced apart by fractions of a millimeter, and especially by only a few microns.

Changes may be made within the scope and spirit of the appended claims which define what is believed to be new and desired to have protected by Letters Patent.

We claim:

1. A method of producing a semiconductor arrangement by alloying electrode metal in a semiconductor body, comprising the steps of assembling the individual components of the arrangement in the cavity of a mold constructed of a material which does not wet the semiconductor components, the configuration of said cavity and the dimensions thereof corresponding to those of the arrangement, whereby said components are supported in their respective desired relative positions, embedding said mold in a powder of a substance which does not react with the semiconductr components, confining such powder, applying pressure to the confined powder, and heating the assembled parts, while under such pressure, to the alloying temperature of the respective components.

2. A method according to claim 1, wherein said mold is made of paper foil.

3. A method according to claim 1, wherein said mold is made of a foil of synthetic material.

4. A method according to claim 1, wherein said mold is made of a pressed powder pill.

References Cited by the Examiner

UNITED STATES PATENTS

| | | | |
|---|---|---|---|
| 2,510,840 | 6/50 | Stowe | 18—34 |
| 2,512,535 | 6/50 | Wiltshire | 18—34 |
| 2,840,495 | 6/58 | Treuting | 148—1.5 |
| 2,910,394 | 10/59 | Scott | 148—1.5 |
| 2,960,419 | 11/60 | Emeis | 148—1.5 |
| 2,979,808 | 4/61 | Booth | 29—493 X |
| 2,989,801 | 6/61 | Blanding | 29—423 X |
| 3,005,257 | 10/61 | Fox | 29—423 X |
| 3,009,840 | 11/61 | Emeis | 148—1.5 X |
| 3,043,726 | 7/62 | Jochems | 148—177 |

DAVID L. RECK, *Primary Examiner.*

HYLAND BIZOT, *Examiner.*